US009576410B2

(12) United States Patent
Mattern

(10) Patent No.: US 9,576,410 B2
(45) Date of Patent: Feb. 21, 2017

(54) SYSTEM AND METHOD FOR IMPLEMENTING A THREAT CONDITION PROTOCOL IN PASS CONTROL

(76) Inventor: Jeremy Keith Mattern, Houston, TX (US)

( * ) Notice: Subject to any disclaimer, the term of this patent is extended or adjusted under 35 U.S.C. 154(b) by 0 days.

(21) Appl. No.: 13/544,025

(22) Filed: Jul. 9, 2012

(65) Prior Publication Data

US 2014/0009257 A1 Jan. 9, 2014

(51) Int. Cl.
*H04L 9/32* (2006.01)
*G07C 9/00* (2006.01)

(52) U.S. Cl.
CPC ....... *G07C 9/00087* (2013.01); *G07C 9/00103* (2013.01)

(58) Field of Classification Search
CPC . G06Q 10/0635; G05B 13/00; G07C 9/00103; G07C 9/00087
USPC .......................................................... 340/5.2
See application file for complete search history.

(56) References Cited

U.S. PATENT DOCUMENTS

| | | | | |
|---|---|---|---|---|
| 7,401,732 B2 * | 7/2008 | Haddad | G07C 9/00007 | 235/380 |
| 7,451,002 B2 * | 11/2008 | Choubey | G05B 23/0283 | 128/898 |
| 7,898,385 B2 * | 3/2011 | Kocher | G07C 9/00087 | 340/5.52 |
| 2005/0171787 A1 * | 8/2005 | Zagami | G06Q 20/401 | 285/382 |
| 2007/0198450 A1 * | 8/2007 | Khalsa | G06Q 10/06 | 706/47 |
| 2010/0156630 A1 * | 6/2010 | Ainsbury | G07C 9/00103 | 340/540 |
| 2011/0173146 A1 * | 7/2011 | Hnatio | G06Q 10/06 | 706/14 |
| 2011/0221565 A1 * | 9/2011 | Ludlow | G07C 9/00031 | 340/5.6 |
| 2012/0057741 A1 * | 3/2012 | Macklin | G01N 1/02 | 382/100 |
| 2012/0133482 A1 * | 5/2012 | Bhandari | G07C 9/00103 | 340/5.2 |

* cited by examiner

*Primary Examiner* — Naomi Small
(74) *Attorney, Agent, or Firm* — Spradley PLLC; Michael Spradley

(57) ABSTRACT

This disclosure relates to a system and method for implementing threat condition in pass control. In one embodiment, a method for implementing threat condition can comprise, receiving by a checkpoint computer, from a server, a threat condition status. The method can further comprise requiring from a visitor at a checkpoint an information set by the checkpoint computer, the information dependent on the threat condition. The method can further comprise issuing a pass to the visitor only if the visitor supplies the information set at the checkpoint.

13 Claims, 9 Drawing Sheets

SYSTEM AND METHOD FOR IMPLEMENTING A THREAT CONDITION PROTOCOL IN PASS CONTROL

BACKGROUND

This disclosure relates to a system and method for implementing a threat condition protocol in pass control.

Currently, Force Protection Conditions (FPCON), as mandated by Department of Defense, describes the amount of measures security agencies need to take in response to various levels of terrorist threats against military facilities. A threat condition status, like FPCON, can initiate military personnel to implement different measures in response to various levels of threats and potential threats against the United States or any military facility. During these situations, the threat condition status can be communicated through a chain of command and other communication protocols within a military organization. In any emergency or critical situation, immediate dissemination of information to authorized personnel and/or the military organization is very important. However, as it currently stands, communications of critical information can involve a long, time-consuming process.

As a result, it would be useful to have an improved system and method for implementing a threat condition protocol in pass control.

SUMMARY

This disclosure relates to a system and method for implementing a threat condition protocol in pass control. In one embodiment, a method for implementing threat condition protocol can comprise, receiving by a checkpoint computer, from a server, a threat condition status. The method can further comprise requiring from a visitor at a checkpoint an information set by the checkpoint computer, the information dependent on the threat condition. The method can further comprise issuing a pass to the visitor only if the visitor supplies the information set at the checkpoint.

In another embodiment, a mobile device can receive a threat condition status from a server, request an information set from a visitor, the information dependent on the threat condition status; and issue a pass to the visitor only if the visitor supplies the information set at the checkpoint.

In another embodiment, a system can comprise a computer readable storage medium having a computer readable program code embodied therein. The computer readable program code can be adapted to be executed to implement the abovementioned method.

DETAILED DESCRIPTION

Described herein is a system and method for implementing a threat condition protocol in pass control. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
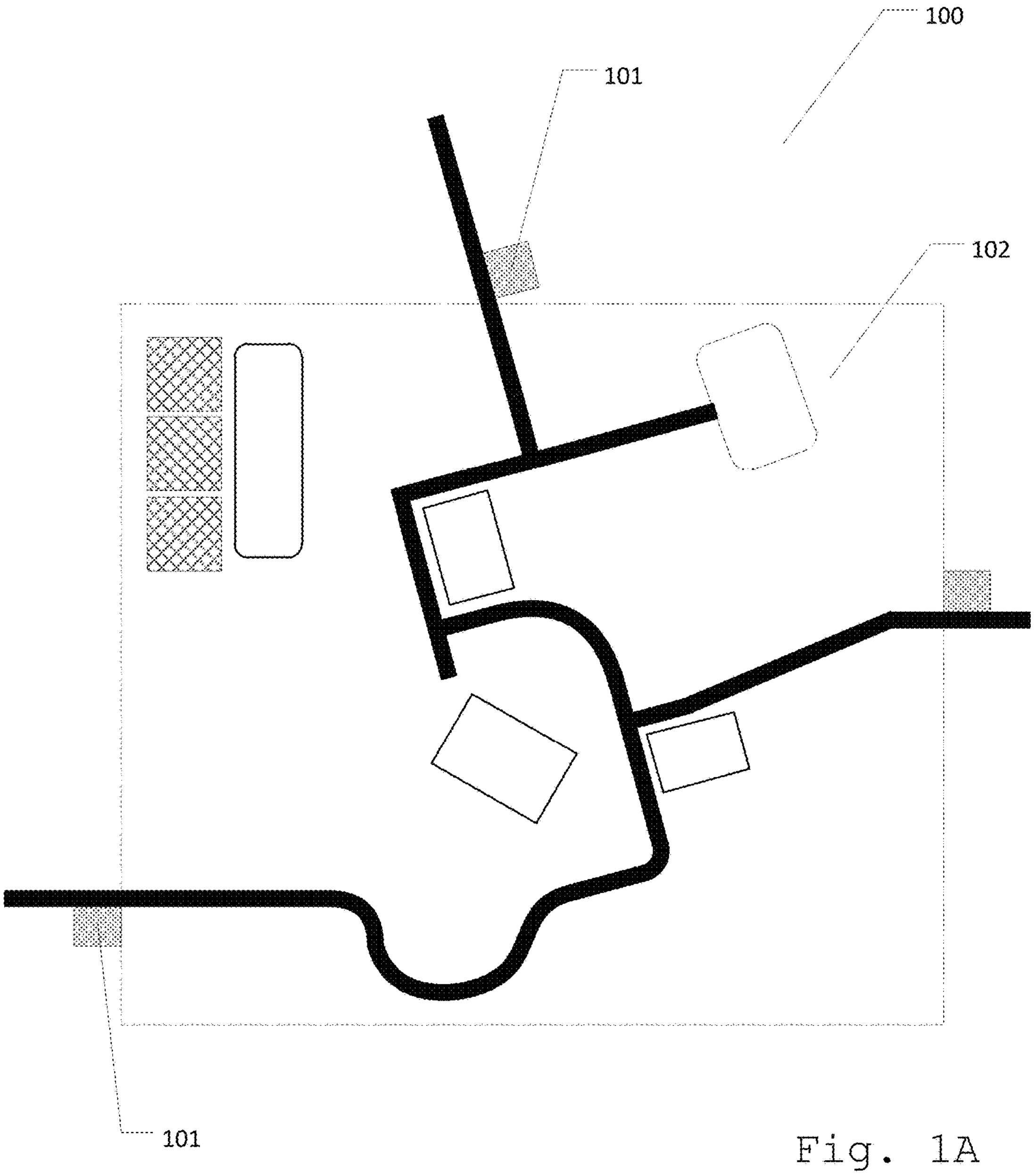
FIG. 1A illustrates an aerial view of a facility.

FIG. 1A illustrates an aerial view of a facility 100 comprising one or more checkpoints 101 strategically placed around a secured area 102. Facility 100 can refer to any public or private installation designed to restrict unauthorized individuals from accessing, such as a military installation. Secured area 102 can be the area within the border of facility 100. Secured area 102 can be the area protected and restricted by checkpoints 101. Checkpoints 101 can be a structure or an area within facility 100 that functions as an entry point into secured area 102. Vehicles and/or visitors can be subjected to inspections and background checks before passing through checkpoints 101. For purposes of this disclosure, the term "visitor" can comprise any person at checkpoint 101 attempting to obtain a pass, permission, or qualification to enter secured area 102.

Figure 1B:
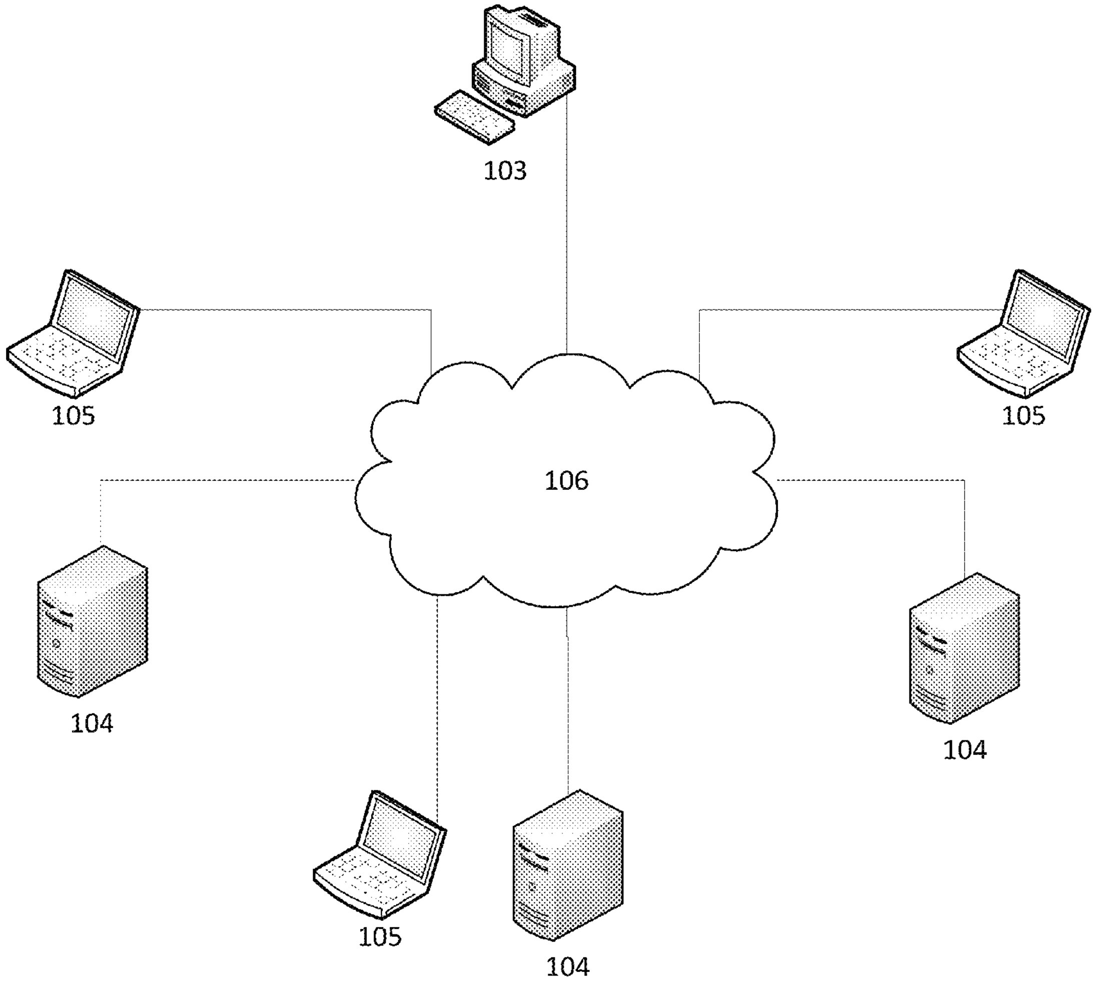
FIG. 1B illustrates a threat condition system.

FIG. 1B illustrates a threat condition system comprising a command center computer 103, one or more military installation servers 104, and one or more checkpoint computers 105 connected via network 106. Command center computer 103 can be in a command center, and is capable of carrying out arithmetic, and logic operations. Command center computer 103 can provide a centralized set of instructions to carry out orders in an organization. Command center computer 103 can be capable of receiving reports, and sending out sets of commands to different devices connected through network 106. Command center computer 103 can include but is not limited to, a server, a desktop, a laptop and/or a mobile device.

Checkpoint computer 105 can be any equipment capable of carrying out arithmetic, and logic operations. Checkpoint computer 105 can store and send out data information through network 106. Checkpoint computer 105 can include but is not limited to, a laptop and/or a mobile device. Checkpoint computers 105 can be placed at each checkpoint 101 and can be accessible to authorized security personnel stationed at the checkpoint. In another embodiment, checkpoint computer 105 can be disseminated within facility 100. In one embodiment, checkpoint computer 105 can comprise an input and/or output device such as a card reader. In another embodiment, checkpoint computer 105 and input/output device such as card reader can be connected and considered as a single device.

Network 106 can be a wide area network (WAN), or a combination of local area network (LAN), and/or piconets. Network 106 can be hard-wired, wireless, or a combination of both. A LAN can be a network within a single organization while WAN can be the Internet.

Figure 2:
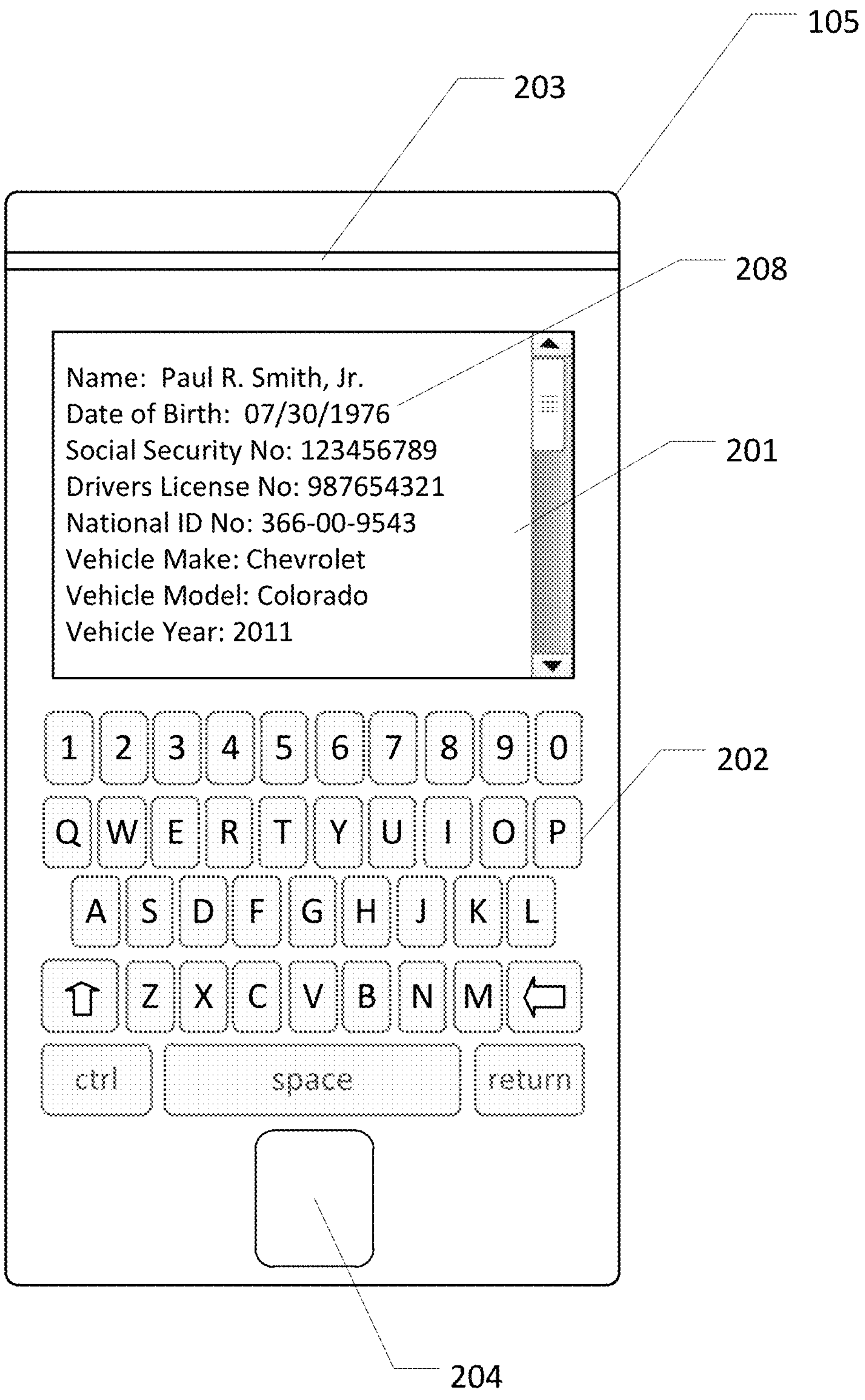
FIG. 2 illustrates an embodiment of a checkpoint computer.

FIG. 2 illustrates an embodiment of checkpoint computer 105 as a mobile device. Mobile device can include, but is not limited to, a screen 201, a keypad 202, a card reader 203, and/or a fingerprint scanner 204. Other input devices can include track balls, joy sticks, or scroll wheels. Screen 201 can be a mere display output, or can also be a touch screen, allowing for capturing of identity information 208. Identity information 208 can include a visitor's name, military rank, serial number, grade, military organization, military installation, address, and/or date of birth. Keypad 202 can comprise of a plurality of physical buttons on mobile device, however in an embodiment were screen 201 is a touch screen, keypad 202 can be represented virtually on screen 201. Card reader 203 can read information from an identification card. An identification card can encode information in various ways. Information can be printed on the information card. Also, information can be placed on the card in a machine-readable form. Such forms can include magnetic strip, barcode or even radio frequency identification (RFID) chip. An identification card can include, but is not limited to, a civilian or military identification card, a passport, a school identification badge or a credit card. In one embodiment, card reader 203 can read a magnetic strip on an identification card. In another embodiment, card reader 203 can read information encoded in a barcode on an identification card. In another embodiment card reader 203 comprises a (RFID) chip receiver to read an RFID chip in an identification card. In one embodiment, mobile device can read information encoded in a digital fingerprint scanned from fingerprint scanner 204. In another embodiment, card reader 203 can read an integrated circuit on a card.

Figure 3A:
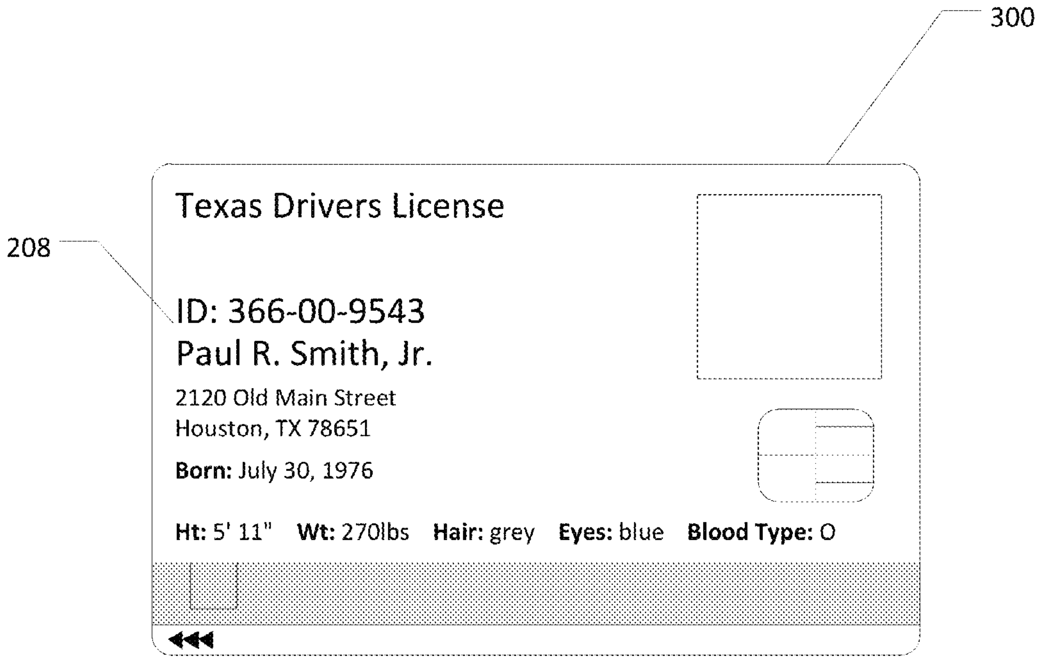
FIG. 3A illustrates a front view of an identification card.

FIG. 3A illustrates a front view of an identification card 300 comprising identification card information. Identification card information can comprise identity information 208, and can comprise an identification number, name, address, birthday, rank, serial number, driver license number, social security number, and/or any other information encoded on identification card 300 whether written, magnetically encoded, or encoded by some other method in the art. ID can be military issued or civilian issued.

Figure 3B:
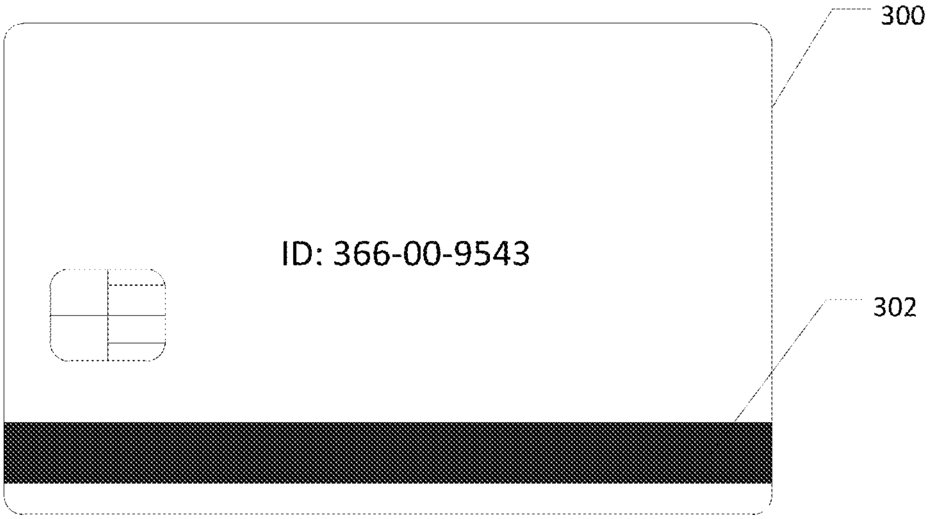
FIG. 3B illustrates a back view of an identification card.

FIG. 3B illustrates a back view of identification card 300 comprising a machine-readable zone 302. Any type of device such as card reader, can read machine-readable zone 302, which is capable of decoding and transcribing identification card information from machine-readable zone 302. Machine-readable zone 302 can be in any form such as a magnetic strip, barcode, or RFID chip.

Figure 4A:
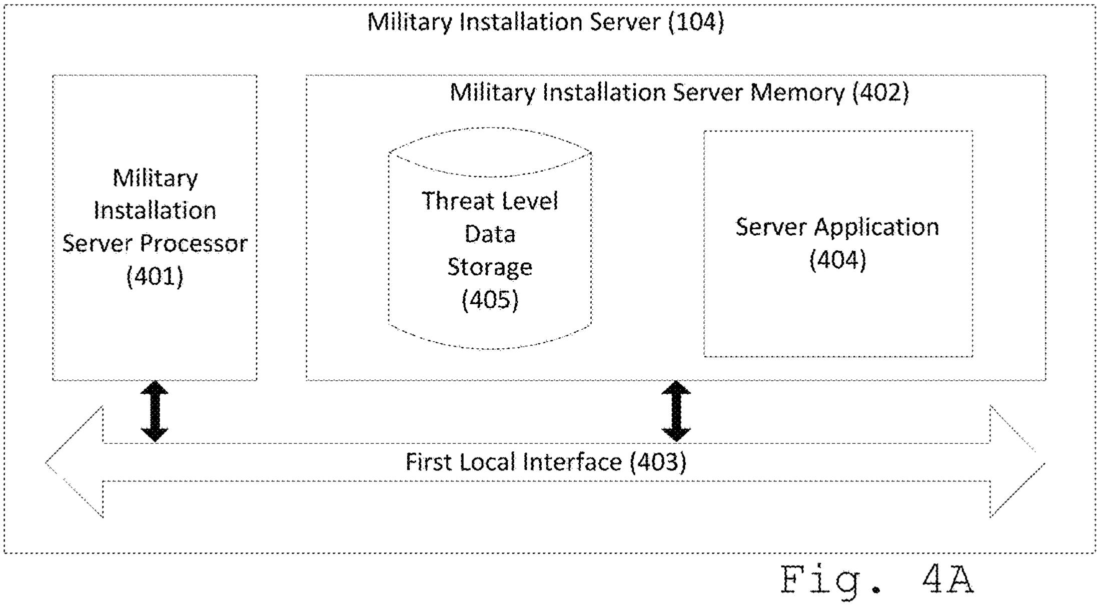
FIG. 4A illustrates a schematic diagram of a military installation server.

FIG. 4A illustrates a schematic block diagram of military installation server 104 according to an embodiment of the present disclosure. Military installation server 104 can comprise a military installation server processor 401, a military installation server memory 402, and a first local interface 403. First local interface 403 can be a program that controls a display for the user, which can allow user to view and/or interact with military installation server 104. Military installation server processor 401 can be a processing unit that performs a set of instructions stored within military installation server memory 402. Military installation server memory 402 can include a server application 404, and a threat level data storage 405. Server application 404 can be a program providing business logic for military installation server 104. Further, server application 404 can perform functions such as adding, updating, deleting, transferring, and retrieving information from threat level data storage 405. In one embodiment, server application 404 can interface with a web browser, such that a person can access, add, update, delete, transfer, or receive information from server application 404, using a web browser.

Military installation server 104 includes at least one processor circuit, for example, having military installation server processor 401 and military installation server memory 402, both of which are coupled to first local interface 403. To this end, the military installation server 104 can comprise, for example, at least one server, computer or like device. First local interface 403 can comprise, for example, a data bus with an accompanying address/control bus or other bus structure as can be appreciated.

Stored in military installation server memory 402 described herein above are both data and several components that are executable by military installation server processor 401. In particular, stored in the military-installation server memory 402 and executable by military installation server processor 401 are server application 404, and potentially other applications. Also stored in military installation server memory 402 can be threat level data storage 405 and other data. In addition, an operating system can be stored in military installation server memory 402 and executable by military installation server processor 401.

Figure 4B:
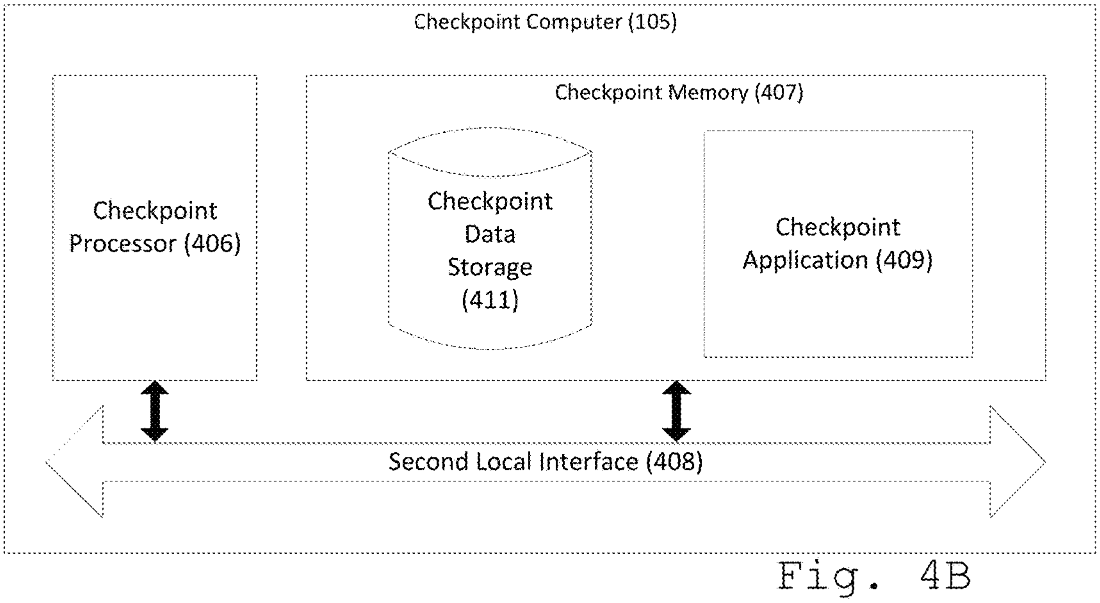
FIG. 4B illustrates a schematic diagram of a checkpoint computer.

FIG. 4B illustrate a schematic block diagram of checkpoint computer 105 according to an embodiment of the present disclosure. Checkpoint computer 105 can comprise a checkpoint processor 406, a checkpoint memory 407, and a second local interface 408. Second local interface 408 can be a program that controls a display for the user, which can allow user to view and/or interact with checkpoint computer 105. Checkpoint processor 406 can be a processing unit that performs set of instructions stored within checkpoint memory 407. Checkpoint memory 407 can include a checkpoint application 409, and a checkpoint data storage 411. Checkpoint application 409 can be a program providing business logic for checkpoint computer 105. Further, checkpoint application 409 can perform functions such as adding, updating, deleting, transferring, and retrieving information from checkpoint data storage 411.

Checkpoint computer 105 includes at least one processor circuit, for example, having checkpoint processor 406 and checkpoint memory 407, both of which are coupled to second local interface 408. To this end, the checkpoint computer 105 can comprise, for example, at least one server, computer or like device. Second local interface 408 can comprise, for example, a data bus with an accompanying address/control bus or other bus structure as can be appreciated.

Stored in checkpoint memory 407 described herein above are both data and several components that are executable by checkpoint processor 406. In particular, stored in the checkpoint memory 407 and executable by checkpoint processor 406 are checkpoint application 409, and potentially other applications. Also stored in checkpoint memory 407 can be a threat level data storage 405 and other data. In addition, an operating system can be stored in checkpoint memory 407 and executable by checkpoint processor 406.

It is understood that there can be other applications that are stored in military installation server memory 402 and checkpoint memory 407, and are executable by military installation server processor 401 and checkpoint processor 406 as can be appreciated. Where any component discussed herein is implemented in the form of software, any one of a number of programming languages can be employed such as, for example, C, C++, C#, Objective C, Java, Java Script, Perl, PHP, Visual Basic, Python, Ruby, Delphi, Flash, or other programming languages.

A number of software components can be stored in military installation server memory 402 and checkpoint memory 407, and are executable by military installation server processor 401 and checkpoint processor 406. In this respect, the term "executable" means a program file that is in a form that can ultimately be run by military installation server processor 401 and checkpoint processor 406. Examples of executable programs can be, for example, a compiled program that can be translated into machine code in a format that can be loaded into a random access portion of military installation server memory 402 and checkpoint memory 407, and run by military installation server processor 401 and checkpoint processor 406, source code that can be expressed in proper format such as object code that is capable of being loaded into a random access portion of military installation server memory 402 and checkpoint memory 407, and executed by military installation server processor 401 and checkpoint processor 406, or source code that can be interpreted by another executable program to generate instructions in a random access portion of military installation server memory 402 and checkpoint memory 407 to be executed by military installation server processor 401 and checkpoint processor 406, etc. An executable program can be stored in any portion or component of military installation server memory 402 and checkpoint memory 407 including, for example, random access memory (RAM), read-only memory (ROM), hard drive, solid-state drive, USB flash drive, memory card, optical disc such as compact disc (CD) or digital versatile disc (DVD), floppy disk, magnetic tape, network attached/addressable storage, or other memory components.

Figure 4C:
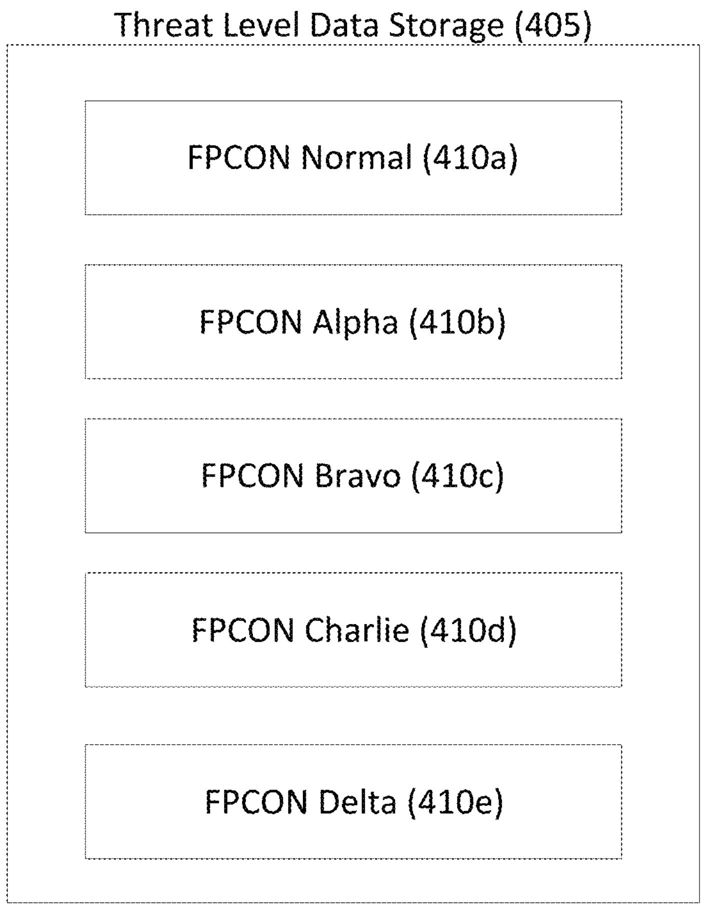
FIG. 4C illustrates a threat level data storage.

FIG. 4C illustrates threat level data storage 405 comprising one or more condition statuses 410. In one example, threat level data storage 405 can comprise a set of threat statuses 410. For example, force protection condition comprises a number of condition statuses 410, including FPCON Normal 410*a*, FPCON Alpha 410*b*, FPCON Bravo 410*c*, FPCON Charlie 410*d*, and FPCON Delta 410*e*. Each condition status 410 can comprise directives, description of necessary measures to be implemented, and level of threat against any facilities, equipment, and/or personnel. Condition status 410 can be active or inactive system-wide or, in one embodiment, for select regions or facilities. Condition status can comprise, be associated with, or otherwise be linked with an information set requirement or other protocol. When such condition status 410 is active, its associated information set requirement can be enforced on visitors at checkpoint 101. Such information set can be stored in threat level data storage 405. The required information set can comprise identity information and/or visitor class such as military or citizen. Visitor can provide information set at checkpoint. 101. For example, FPCON Normal 410*a* can indicate that there is no credible threat of terrorist activity exists. As such, visitors and/or military personnel need to present one identification card 300 at checkpoints 101. FPCON Alpha 410*b*, can exist when there is a general threat against personnel and/or installations. At this level, visitor would usually need to present one or two identification card 300 at checkpoints 101. FPCON Bravo 410*c* can be raised once a more predictable threat can happen. For this level, visitor personnel may be required to present two identification card 300 at checkpoint 101. FPCON Charlie 410*d* can be applied once an incident occurs or intelligence is received that indicates some form of terrorist action against personnel or facility is imminent. At this condition, visitors, and/or military personnel must present two identification card 300 at checkpoints 101. FPCON Delta 410*e* can be raised in the immediate area where a terrorist attack has occurred or when intelligence acquires information that a specific location or person is likely to be targeted by a terrorist attack. In this level of threat, secured area 102 can be restricted to essential individuals only.

Information set can be information commonly found on identification card 300, or can be extractable data from identification card 300, such as by swiping or other manners of automated reading, as discussed above. Identification set can also comprise information such as name, date of birth, rank or other information commonly associated with the identity of an individual.

Figure 5:
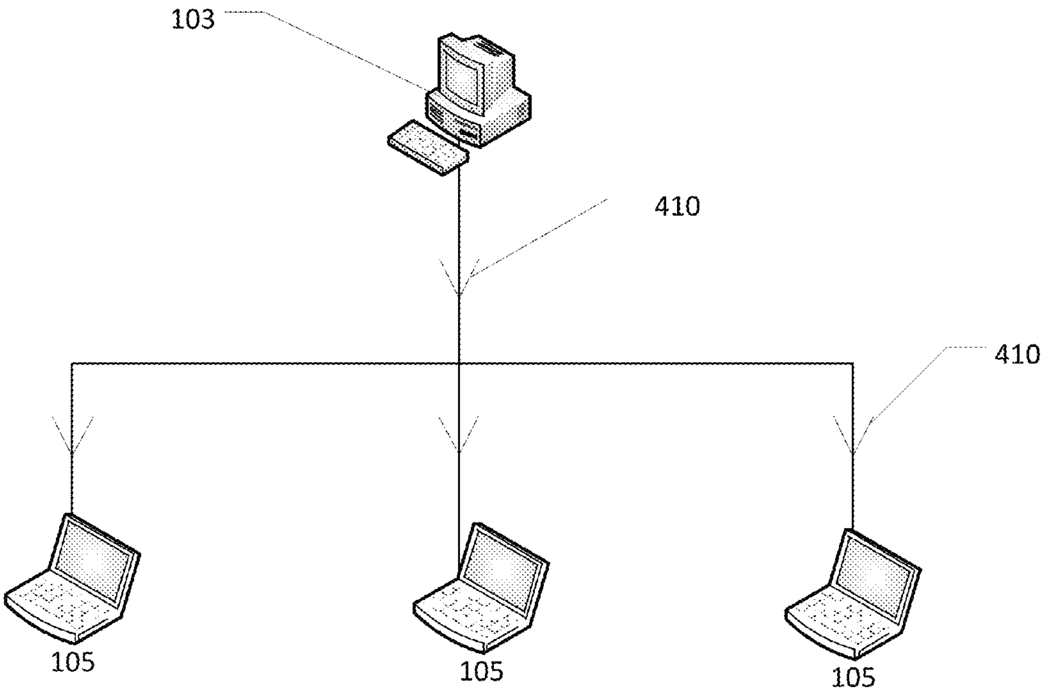
FIG. 5 illustrates an exemplary method of pushing and/or pulling of a threat condition status from a command center computer.

FIG. 5 illustrates an exemplary method of pushing and/or pulling of threat level data storage 405 on command center computer 103. Once a situation has been determined, command center computer 103 can push or send condition status updates to one or more checkpoint computer 105. In another embodiment, one or more checkpoint computers 105 can pull or request condition status updates coming from command center computer 103. In one embodiment, command center computer can interface with a web browser, such that a person can access, add, update, delete, transfer, or receive information from server application 404, using a web browser. In another embodiment, authorized personnel can directly interface with an application on command center computer 103.

Figure 6:
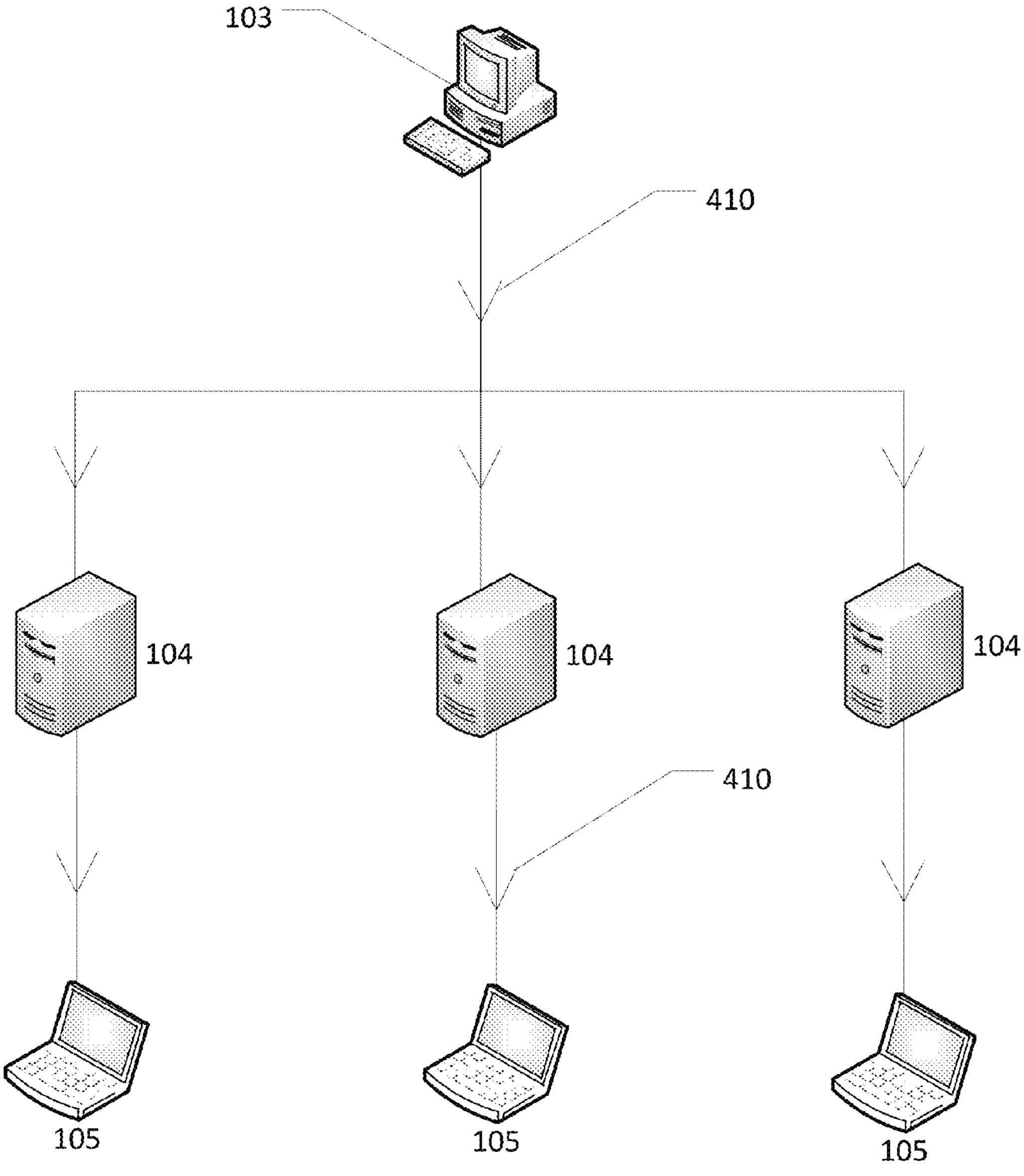
FIG. 6 illustrates an exemplary method for pushing and/or pulling of a threat condition status between a command center computer, one or more military installation servers, and one or more checkpoint computers.

FIG. 6 illustrates an exemplary method of pushing and/or pulling of condition status updates between command center computer 103, military installation servers 104, and checkpoint computers 105. In one embodiment, command center computer 103 can transmit condition status updates to military installation severs 104. In another embodiment, military installation servers 104 can pull condition status updates coming from command center 103. In such embodiment threat condition statuses are pushed to checkpoint computers 105. Further, in another embodiment checkpoint computers 105 can request condition status updates from military installation servers 104.

For purposes of this disclosure, sending and receiving threat condition status between command center computer 103, military installation servers 104, and checkpoint computers 105 can be made through network 106. Moreover, the threat condition status from different military installation servers 104 and checkpoint computers 105 can be declared and transmitted by command center computer 103. As such, when command center computer 103 sends threat condition status to military installation servers 104, and then to checkpoint computers 105, threat condition status can be stored in threat level data storage 405 of military installation server memory 402, and checkpoint memory 407. If a new threat condition status arises, command center computer 103 can declare threat condition status 410 and push the new condition status to military installation servers 104, and/or checkpoint computers 105. In this scenario the new threat condition status replaces the old threat condition status and stores the new threat condition status in threat level data storage 405 of military installation server memory 402 and/or checkpoint memory 407. Thus, military installation server memory 402 and checkpoint memory 407 can use the updated threat condition status.

Figure 7:
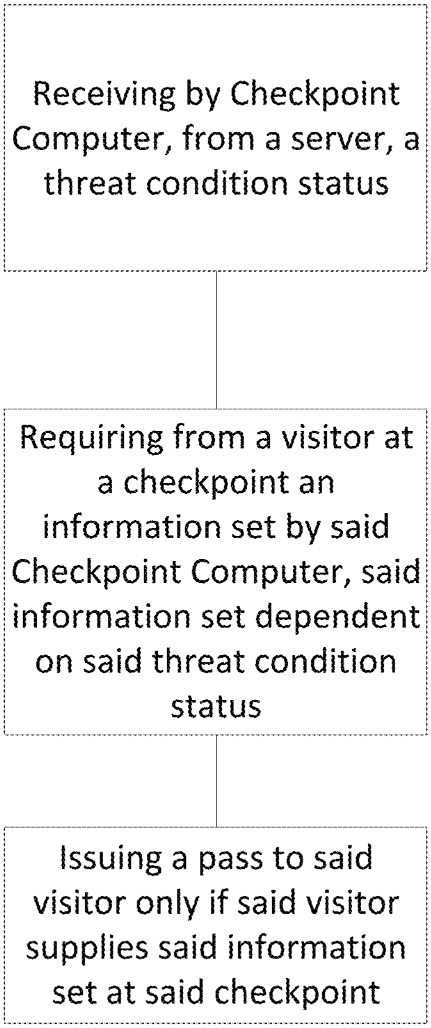
FIG. 7 illustrates an exemplary method for getting a threat condition status from a command center computer.

FIG. 7 illustrates an exemplary method for getting threat level data storage 405 from command center computer 103. Authorized personnel can get threat condition status from threat level data storage 405 from either military installation server 104 or checkpoint computers 105. Checkpoint computers 105 and military installation server 104 can either request threat condition status, or automatically receive threat condition status from command center computer 103. Thereafter, threat condition status stored in command center computer 103, can be transmitted to threat level data storage 405 of military installation server 104 and checkpoint computers 105 through network 106. As such, military installation server memory 402 and checkpoint memory 407 can acquire threat condition status 410 and display threat condition status 410 at military installation server 104 and/or checkpoint computer 105.

In a checkpoint scenario, visitors can be requested to present an identification card 300 to the guard on duty before accessing secured area 102. Using checkpoint computer 105, the guards can be updated with threat condition status that is currently being implemented. Thereafter, the guard can use the identity card to check background information on visitors. As such, guards at checkpoint 101 can immediately perform the necessary measures needed. Moreover, visitors can only access secured area 102 when the required identity information 208 is provided.

An example scenario wherein force protection condition status received by checkpoint computer 105 is FPCON Delta 410*e*, checkpoint personnel can be required to request military identification, thereby preventing civilians from entering secured area 102. In one embodiment, the guards can be provided with additional instructions in threat level data storage data storage 405. Lastly, military installation server 104 can disseminate any changes and/or updates in threat condition status to checkpoint computers 105 as is needed.

For purposes of this disclosure, military installation server memory 402 and checkpoint memory 407 is defined herein as including both volatile and nonvolatile memory and data storage components. Volatile components are those that do not retain data values upon loss of power. Nonvolatile components are those that retain data upon a loss of power. Thus, military installation server memory 402 and checkpoint memory 407 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, network attached/addressable storage, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, military installation server processor 401 and checkpoint processor 406 can represent multiple military installation server processor 401 and checkpoint processor 406, and military installation server memory 402 and checkpoint memory 407 can represent multiple military installation server memory 402 and checkpoint memory 407 that operate in parallel processing circuits, respectively. In such a case, first local interface 403 and second local interface 408 can be an appropriate network, including network 106 that facilitates communication between any two of the multiple military installation server processor 401 and checkpoint processor 406, between any military installation server processor 401 and checkpoint processor 406, and any of the military installation server memory 402 and checkpoint memory 407, or between any two of the military installation server memory 402 and checkpoint memory 407, etc. First local interface 403 and second local interface 408 can comprise additional systems designed to coordinate this communication, including, for example, performing load balancing. Military installation server processor 401 and checkpoint processor 406 can be of electrical or of some other available construction.

Although server application 404 and checkpoint application 409, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 7 show the functionality and operation of an implementation of portions of server application 404 and checkpoint application 409. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as military installation server processor 401 and checkpoint processor 406 in a computer system or other system. The machine code can be converted from the source code, etc. If embodied in hardware, each block can represent a circuit or a number of interconnected circuits to implement the specified logical function(s).

Although the flowcharts of FIG. 7 show a specific order of execution, it is understood that the order of execution can differ from that which is depicted. For example, the order of execution of two or more blocks can be scrambled relative to the order shown. Also, two or more blocks shown in succession in FIG. 6 can be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including server application 404 and checkpoint application 409, that comprises software or code can be embodied in any computer-readable storage medium for use by or in connection with an instruction execution system such as, for example, military installation server processor 401 and checkpoint processor 406 in a computer system or other system. In this sense, the logic can comprise, for example, statements including instructions and declarations that can be fetched from the computer-readable storage medium and executed by the instruction execution system.

In the context of the present disclosure, a "computer-readable storage medium" can be any medium that can contain, store, or maintain the logic or application described herein for use by or in connection with the instruction execution system. The computer-readable storage medium can comprise any one of many physical media such as, for example, electronic, magnetic, optical, electromagnetic, infrared, or semiconductor media. More specific examples of a suitable computer-readable storage medium would include, but are not limited to, magnetic tapes, magnetic floppy diskettes, magnetic hard drives, memory cards, solid-state drives, USB flash drives, or optical discs. Also, the computer-readable storage medium can be a random access memory (RAM) including, for example, static random access memory (SRAM) and dynamic random access memory (DRAM), or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for implementing threat condition protocol in pass control, comprising receiving by a checkpoint computer, from a military installation server, a threat condition status, said threat condition status comprising one or more measures to be implemented, one of said one or more measures a requirement that a checkpoint collect an information set from a visitor, said information set dependent on a specific threat;

requiring from said visitor at said checkpoint said information set by said checkpoint computer, said information set dependent on said threat condition status;

issuing a pass to said visitor only if said visitor supplies said information set at said checkpoint; and restricting said visitor during a height threat condition status if said visitor is not an essential individual.

2. The method of claim 1 wherein said checkpoint computer pulls said threat condition status from said military installation server.

3. The method of claim 1 wherein said military installation server pushes said threat condition status to said checkpoint computer.

4. The method of claim 1 wherein said military installation server first receives said threat condition status from a command center computer.

5. The method of claim 4 wherein said command center computer pushes said threat condition status to said military installation server.

6. The method of claim 1 wherein said military installation server pulls said threat condition status from a command center computer.

7. The method of claim 1 wherein checkpoint computer is a mobile device.

8. The method of claim 1 wherein said information set comprises military identification card information.

9. The method of claim 1 wherein said information set comprises a name and date of birth of a visitor.

10. The method of claim 1 wherein said information set comprises two separate identification cards.

11. The method of claim 1 wherein said threat condition status is a force protection condition status.

12. A mobile device that receives a threat condition status from a server, wherein said threat condition status is a force protection condition status, said threat condition status comprising one or more measures to be implemented, one of said one or more measures a requirement that an information set be collected from a visitor at a checkpoint, said information set dependent on a specific threat;

requests said information set from said visitor, said information set dependent on said threat condition status; and issues a pass to said visitor only if said visitor supplies said information set at said checkpoint; and restricts said visitor during a height threat condition status if said visitor is not an essential individual.

13. A non-transitory computer readable storage medium having a computer readable program code embodied therein, wherein the computer readable program code is adapted to be executed by a computer processor to implement the method of claim 1.

* * * * *